United States Patent
Feldtkeller (10) Patent No.: US 7,492,827 B2
(45) Date of Patent: Feb. 17, 2009

(54) METHOD FOR DATA TRANSMISSION VIA A DATA TRANSMISSION PATH WITH INDUCTIVE TRANSFORMERS, AND A DATA TRANSMISSION APPARATUS

(75) Inventor: Martin Feldtkeller, Munich (DE)

(73) Assignee: Infineon Technologies AG, Munich (DE)

( * ) Notice: Subject to any disclaimer, the term of this patent is extended or adjusted under 35 U.S.C. 154(b) by 467 days.

(21) Appl. No.: 11/201,822

(22) Filed: Aug. 11, 2005

(65) Prior Publication Data
US 2006/0269002 A1 Nov. 30, 2006

(30) Foreign Application Priority Data
Dec. 8, 2004 (DE) .................. 10 2004 039 218

(51) Int. Cl.
*H04B 3/00* (2006.01)
*H04L 25/00* (2006.01)
(52) U.S. Cl. .................. 375/258; 375/257; 375/258; 375/260
(58) Field of Classification Search ............. 375/258, 375/256, 257; 326/16, 26
See application file for complete search history.

(56) References Cited

U.S. PATENT DOCUMENTS

| | | | |
|---|---|---|---|
| 4,027,152 A | 5/1977 | Brown et al. | |
| 4,968,970 A * | 11/1990 | LaPorte | ............ 375/133 |
| 6,091,779 A * | 7/2000 | Griessbach | ............ 375/258 |
| 6,262,600 B1 | 7/2001 | Haigh et al. | |
| 6,525,566 B2 | 2/2003 | Haigh et al. | |
| 6,614,848 B2 * | 9/2003 | Lohr | ............ 375/257 |
| 6,950,567 B2 * | 9/2005 | Kline | ............ 385/15 |
| 7,138,855 B2 * | 11/2006 | Herz et al. | ............ 327/543 |
| 7,167,019 B2 * | 1/2007 | Broyde et al. | ............ 326/30 |

FOREIGN PATENT DOCUMENTS

| | | |
|---|---|---|
| DE | 25 55260 B2 | 6/1976 |
| DE | 102 29 860 A1 | 1/2004 |
| DE | 102 32 642 | 2/2004 |
| DE | 102 44 186 | 4/2004 |
| EP | 1370941 | 1/2004 |

* cited by examiner

*Primary Examiner*—Chieh M Fan
*Assistant Examiner*—Qutbuddin Ghulamali
(74) *Attorney, Agent, or Firm*—Dicke, Billig & Czaja, PLLC (57) ABSTRACT

A method and an apparatus for data transmission via a transmission path having at least two inductive transformers, which each have a primary winding with a time constant and have a secondary winding. The method includes driving the primary windings to transmit an information event by means of drive signals in such a way that the sum of the drive signals follows an envelope curve with an envelope curve duration. The envelope curve being chosen such that its time profile rises within a rise period from an initial value to a maximum value and falls within a fall period from the maximum value back to the initial value, and the magnitudes of the rise period and of the fall period are longer than the time constants of the primary windings. The time profile of the drive signals being dependent on the information to be transmitted and being chosen such that there is at least one steep flank, whose flank duration is shorter than the time constants of the primary windings.

20 Claims, 6 Drawing Sheets

METHOD FOR DATA TRANSMISSION VIA A DATA TRANSMISSION PATH WITH INDUCTIVE TRANSFORMERS, AND A DATA TRANSMISSION APPARATUS

CROSS-REFERENCE TO RELATED APPLICATIONS

This Utility Patent Application claims priority to German Patent Application No. DE 10 2004 039 218.8-32, filed on Aug. 12, 2004, which is incorporated herein by reference.

FIELD OF THE INVENTION

The present invention relates to a method and an apparatus for data transmission via a transmission path having inductive transformers, in particular having coreless or air-cored transformers.

BACKGROUND

Coreless transformers are transformers with a primary winding and a secondary winding without any winding core. The primary and secondary windings in transformers such as these are, by way of example, in the form of planar windings, which are dielectrically insulated from one another and, for example, are arranged on or in a semiconductor body. One such coreless transformer is described, for example, in DE 102 32 642 A1.

Coreless transformers are used as the potential barrier or as DC isolation in data transmission paths, for example, in data transmission paths for driving semiconductor switches, in particular high-side switches in half-bridge circuits, or data transmission paths for data transmission in industrial control systems.

The primary winding of a coreless transformer has a time constant which is governed primarily by the cross section of the winding and by the coil diameter of the winding—which runs in a spiral shape in the case of planar windings. This time constant is the quotient of the inductance and resistance of the primary winding. A voltage on the secondary winding decays with this time constant when a step-function exciter signal is applied to the primary winding. For data transmission via a coreless transformer such as this, a drive circuit on the primary side must produce a drive signal whose flanks have rise periods and fall periods which are considerably shorter than this time constant. Furthermore, an evaluation circuit on the secondary side must be able to identify voltage pulses on the secondary side which are decaying with this time constant. The speed of the transmission and reception circuits which are involved with the data transmission on the primary side and secondary side is thus also determined significantly by the parameters of the windings. In the case of windings which are integrated in or on a chip, the winding parameters significantly govern the required chip area.

By way of example, differential transmission methods are used for signal transmission via data transmission paths with coreless transformers such as these. In methods such as these, information that is contained in a two-value signal is transmitted by means of signal pulses which characterize rising and falling flanks of the signal to be transmitted. In order to distinguish between rising and falling flanks, the transmitted signal pulses may have different amplitudes or mathematical signs, or the signal pulses for rising and falling flanks may be transmitted via different channels. The two-value signal is recovered from the transmitted pulses at the receiver end of the transmission channel by means of a receiving circuit with a suitable detection and demodulation arrangement.

There is a risk in the transmission paths that have been explained of disturbance signals, for example disturbance signals resulting from electromagnetic interference, being injected into the transmission path, which have the same shape and amplitude as a transmitted information pulse and which can lead to transmission errors. When a semiconductor switch is driven via a transmission path such as this, unidentified disturbance pulses can lead to an undesirable switching state of the switching element.

In order to reduce the robustness of a differential transmission method to disturbance pulses, U.S. Pat. No. 4,027,152 and U.S. Pat. No. 6,262,600 each disclose a differential signal transmission method in which flanks of a signal to be transmitted are converted to signal pulses, and in which these signal pulses are in each case repeated periodically in order to make it possible to identify and correct transmission errors caused by disturbance influences. This method has the disadvantage of comparatively high power consumption which results from the periodic repetition of the transmitted signal pulses.

Differential signal transmission methods are known from DE 102 44 186 A1 or DE 102 29 860 A1. In these methods, the time information about rising flanks of a two-value signal is transmitted in the form of pulses via a first transmission channel, and the information about falling flanks of this signal is transmitted in the form of pulses via a second transmission channel. In these known methods, both transmission channels are monitored for disturbance signal detection, in order to retransmit the most recently transmitted payload signal pulse on detection of a disturbance signal.

U.S. Pat. No. 6,525,566 B2 describes a further transmission method via a data transmission path with two coreless transformers. In this method, rising/falling flanks of a two-value signal are in each case converted to radio-frequency signals, and are transmitted via one of the two transmission channels.

If the primary winding is driven by means of square-wave signals, a signal, that is to say a voltage or a current, on the primary winding can rise only as quickly as an associated driver circuit can produce the current. Particularly if the supply voltage is low, parasitic inductances can significantly influence this rise time.

Furthermore, electromagnetic disturbance pulses are produced to a not inconsiderable extent both in the most recently explained method and in the previously explained method, in both of which square-wave pulses for transmission and for driving the primary winding are produced on the primary side.

SUMMARY

Embodiments of the present invention provide a method for data transmission and a data transmission apparatus. In one embodiment, the present invention provides a method for data transmission via a transmission path having at least two inductive transformers, which each have a primary winding with a time constant and a secondary winding. The method includes driving the primary windings to transmit an information event by means of drive signals in such a way that the sum of the drive signals follows an envelope curve with an envelope curve duration. The envelope curve is chosen such that its time profile rises within a rise period from an initial value to a maximum value and falls within a fall period from the maximum value back to the initial value, and the magnitudes of the rise period and of the fall period are longer than a time constant of the primary windings. The time profile of the drive signals being dependent on the information to be transmitted and defined such that there is at least one steep flank, whose flank duration is shorter than the time constants of the primary windings.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention provides a method for data transmission via a transmission path which has at least two inductive transformers. The method is robust with respect to inference and parasitic inductances, causing little radiated electromagnetic interference and can be produced easily. The present invention also provides an apparatus for carrying out a method such as this.

In one embodiment, the invention provides a method for data transmission via a transmission path having at least two inductive transformers which each have a primary winding and a secondary winding provides for the primary winding to be driven by means of drive signals in order to transmit an information event, in such a way that the sum of the drive signals follows an envelope curve with a predetermined envelope curve duration. The envelope curve is in this case chosen such that its time profile rises within the rise from an initial value to a maximum value period, and falls within the fall period back to the initial value, and such that their rise period and fall period are longer than the time constants of the primary windings. The time profile of the drive signals is dependent on the information event to be transmitted and is chosen such that there is at least one steep flank in the time profile, whose rise time or fall time is considerably shorter than the time constants of the primary windings.

In the present application, the expression drive signals for the primary windings means voltages across the primary windings, that is to say voltages applied to the primary windings, or currents through the primary windings.

In order to allow transmission via a single transformer, the associated drive signal—as mentioned initially—must have flanks whose gradient is greater than the reciprocal of the time constant of the primary winding of the respective transformer. Such flanks are the steep flanks of the drive signals, at least one of which is present during the envelope curve duration. In the case of a transmission apparatus, "externally visible" means the sum of the currents detected in order to produce the individual drive signals and the sum of the magnetic fields which result from the individual drive processes. This sum of the currents and of the magnetic fields in the case of the method according to the invention follows the envelope curve, which can be optimized with regard to radiated electromagnetic emissions and the current drawn, and/or the time period for transmission of one information event. The envelope curve preferably has the profile of a Gaussian curve or the profile of a section of a sine-squared curve.

One or more embodiments of the apparatus according to the invention for data transmission have the following features:

a transmission path with at least two inductive transformers, which each have a primary winding and a secondary winding;

a transmission apparatus, which is connected to the primary windings, with an input for supplying a transmission signal which produces drive signals for the primary windings in such a way that the sum of the drive signals follows an envelope curve with an envelope curve duration;

with the envelope curve being chosen such that its time profile rises within a rise period from an initial value to a maximum value and falls within a fall period back to the initial value, and that the magnitudes of the rise period and of the fall period are longer than the time constants of the primary windings; and with the time profile of the drive signals being dependent on the information to be transmitted and being chosen such that there is at least one steep flank, whose rise period or fall period is shorter than the time constants of the primary windings.

Figure 1:
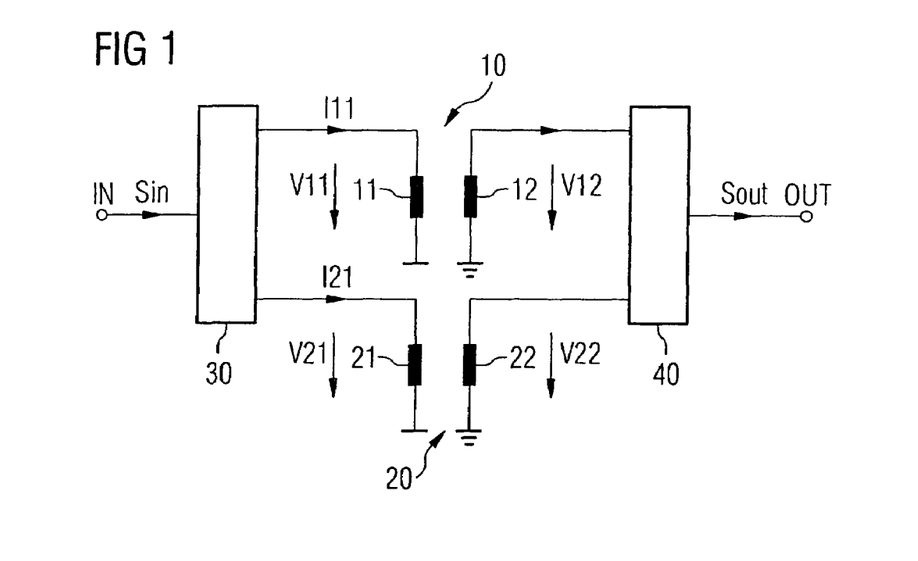
FIG. 1 illustrates a data transmission path with a transmission apparatus and a receiving apparatus, as well as a transmission path which is arranged between the transmission apparatus and the receiving apparatus and has two transformers.

FIG. 1 illustrates one embodiment of an overview of a data transmission apparatus with a transmission apparatus 30 which is supplied with a transmission signal Sin at an input IN, with a receiver apparatus 40 which produces a received signal Sout at an output OUT, and with a transmission path which is arranged between the transmission apparatus 30 and the receiver apparatus 40. The transmission path has two inductive transformers 10, 20, each of which has a primary winding 11, 21 and a secondary winding 12, 22. The primary windings 11, 21 are in this case connected to the transmission apparatus 30, and the secondary windings 12, 22, which are inductively coupled to the primary windings 11, 21, are connected to the receiver circuit 40. The primary windings 11, 21 are connected at a connection facing away from the transmission apparatus 30 to a first or primary-side reference ground potential, and the secondary windings 12, 22 are connected at a connection facing away from the receiver circuit 40 to a second or secondary-side reference ground potential, in which case the first and second reference ground potentials may differ.

For the following explanation, I11, I21 denote the currents through the primary windings, and V11, V21 denote the voltages across the primary windings 11, 21, which are produced by the transmission apparatus 30 as a function of the input signal Sin. V12, V22 denote the voltages across the secondary windings 12, 22, which result by virtue of the inductive coupling from the voltages V11, V21 applied across the primary windings 11, 21 and from the currents I11, I21 flowing through the primary windings, respectively.

A first exemplary embodiment of a data transmission method according to the invention for data transmission via a data transmission apparatus as illustrated in FIG. 1 will be explained in the following text with reference to FIG. 2 for the transmission of an information event which may assume two different states.

Figure 2:
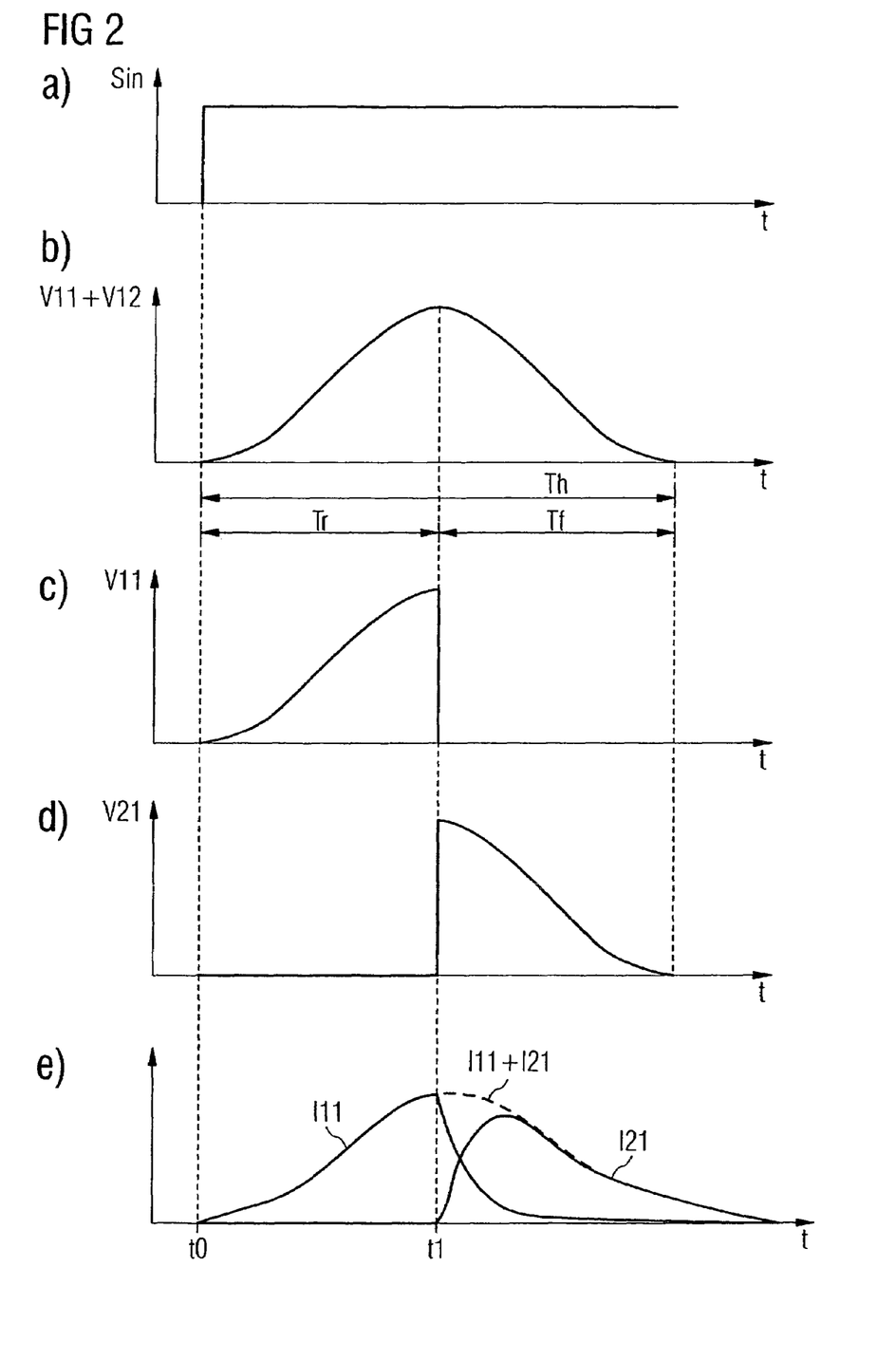
FIG. 2 illustrates, for a first exemplary embodiment of the method according to the invention, the time profiles of the voltage across the primary windings (FIGS. 2c and 2d) and of the currents through the primary windings (FIG. 2e) as a function of an input signal (FIG. 2a).

The information event to be transmitted in the example illustrated in FIG. 2 represents a rising flank of the transmission signal Sin, which occurs at a time t0. Once this information event has occurred, the primary windings (11, 21 in FIG. 1) are driven in such a way that the sum of the primary voltages V11, V21 follows an envelope curve with a predetermined envelope curve duration Th, with the time profiles of the primary voltages V11, V21 differing as a function of the state or value of the information event to be transmitted. The envelope curve duration defines the time period required for transmission of a predetermined information event, and thus the maximum possible transmission frequency by means of the method. The envelope curve duration is, for example, in the range between 10 ns and 100 ns, thus resulting in transmission rates of between 100 MHz and 10 MHz.

FIG. 2c illustrates the time profile of the first primary voltage V11 on the first primary winding 11, and FIG. 2d shows the time profile of the second primary voltage V21 on the second primary winding 21. FIG. 2b shows the time profile of the envelope curve, which corresponds to the sum of the two primary voltages V11, V21. This envelope curve is chosen such that it rises from an initial value, preferably zero, to a maximum value in the time profile within a rise time Tr and, after reaching the maximum, falls from the maximum value back to the initial value within a fall time Tf, with the envelope curve in the example falling immediately again, after reaching the maximum. Furthermore, the envelope curve is chosen such that the gradient during the rise time Tr and during the fall time Tf has a smaller magnitude than the quotient of the difference between the maximum value and the minimum value and the time constants of the primary windings 11, 21, and such that the rise time Tr and fall time are greater than these time constants. As is known, these time constants correspond to the quotient of the inductance value and resistance value of the primary windings 11, 21.

The time profiles of the first and second primary voltages V11, V21, whose sum corresponds to the envelope curve, are, furthermore, chosen such that at least one "steep" flank is present, whose rise time or fall time is shorter than the time constants of the primary windings 11, 21.

The requirements which result in the sum of the primary voltages V11, V21 corresponding to the envelope curve and which result in such a steep flank are satisfied in the example illustrated in FIG. 2 by the first primary voltage V11 following the envelope curve between the time t0 and a time t1 at which the maximum occurs in the envelope curve, while the second primary voltage V21 is zero. The first primary voltage V11 reaches zero at the time t1, while the second primary voltage V21 rises to the maximum value of the envelope curve, and follows the envelope curve in the rest of the time profile.

FIG. 2e illustrates the time profile of the primary currents I1, I21 through the primary windings 11, 21. The sum of the primary current I11, I21 is also illustrated by the dashed line in FIG. 2e, with this sum signal following the envelope curve signal (as illustrated in FIG. 2b) of the primary voltages V11, V21, with a time delay, as a result of the time constants of the primary windings. The first primary current I11 decays exponentially after the time t1 following the steep falling flank of the first primary voltage V11, while the second primary current I21 approximates exponentially to the envelope curve after the time t1, following the steep rising flank of the secondary primary voltage V21.

The method results in signals being transmitted from the primary to the secondary side of the transformers 10, 20 during the envelope curve period in each case at the time at which the primary voltage V11, V12 has a steep flank, since the gradient of these flanks is sufficiently large with respect to the time constants of the primary windings in order to induce a significant voltage on the secondary side. With reference to the example in FIG. 2, this is the time t1 at which a falling steep flank of the first primary voltage V11 and a rising steep flank of the second primary voltage V21 occur. The gradient of the rise in the first primary voltage V11 prior to this first time t1, and the gradient of the fall in the second primary voltage V21 after this time t1 are too low with respect to the time constants of the primary windings to induce a significant voltage on the secondary side.

One advantage of the method according to the invention is that the sum of the currents through the primary windings, which essentially determine the current drawn by the transmission apparatus 30, follow the envelope curve. The same applies to the sum of the magnetic fields which result from the drive to the two primary coils. The external effect is governed by the magnetic field that results from the total current drawn by the transmission apparatus, and this likewise follows the envelope curve since the total current, that is to say the sum of the primary currents, follows the envelope curve. Any radiated electromagnetic interference which occurs in the method according to the invention is thus dependent exclusively on the time profile of the envelope curve, whose rising and falling flanks can be chosen completely independently of the time constant of the primary windings, and which can thus be optimized with respect to a reduction in the radiated electromagnetic interference. The envelope curve is preferably chosen such that it approximately follows a Gaussian curve within the envelope curve period Th. Any other desired optimized curve profile with respect to radiated electromagnetic interference may, of course, be used for the envelope curve. As a further example of this, a time profile of the envelope curve is feasible based on a raised cosine pulse, as has been known for a long time in data transmission.

The time profiles of the drive signals V11, V21 are preferably chosen such that the steep flank occurs immediately or a short time after a time t1; t3 at which the envelope curve reaches its maximum value. A "short time" means, for example, within a time which corresponds to 0 to 2 times the time constants of the primary windings.

Furthermore, the envelope curve can be matched to the time profiles of the drive signals in such a way that it falls again immediately after t1; t3 of the steep flank of the time profiles of the drive signals V11, V21.

The time profiles in FIG. 2 illustrate the method according to the invention for transmission of a first of two possible states of the information event, specifically in the present case the presence of a rising flank of a two-value transmission signal Sin. All that is needed to transmit a falling flank of the input signal Sin is to interchange the time profiles of the first and second primary voltages.

In the case of a transmission method using two transmission channels, the primary voltages V11, V21 are complementary to one another in the time profile, such that the sum of the primary voltages V11, V21 follows the envelope curve. The requirement for a steep flank, which is required in order to produce a sufficient secondary voltage pulse, in the time profile of one of the primary voltages can in this case be achieved only by the two primary voltages having steep flanks running in opposite directions at one time. It should be noted that the transmission path may also have more than two transformers, with the sum of the primary voltages also following the envelope curve in this case. In this case, the requirement for a steep flank of one of the primary voltages can also be achieved without all of the other primary voltages likewise having to have a steep flank at the same time as a steep flank on one of the primary voltages.

Figure 3:
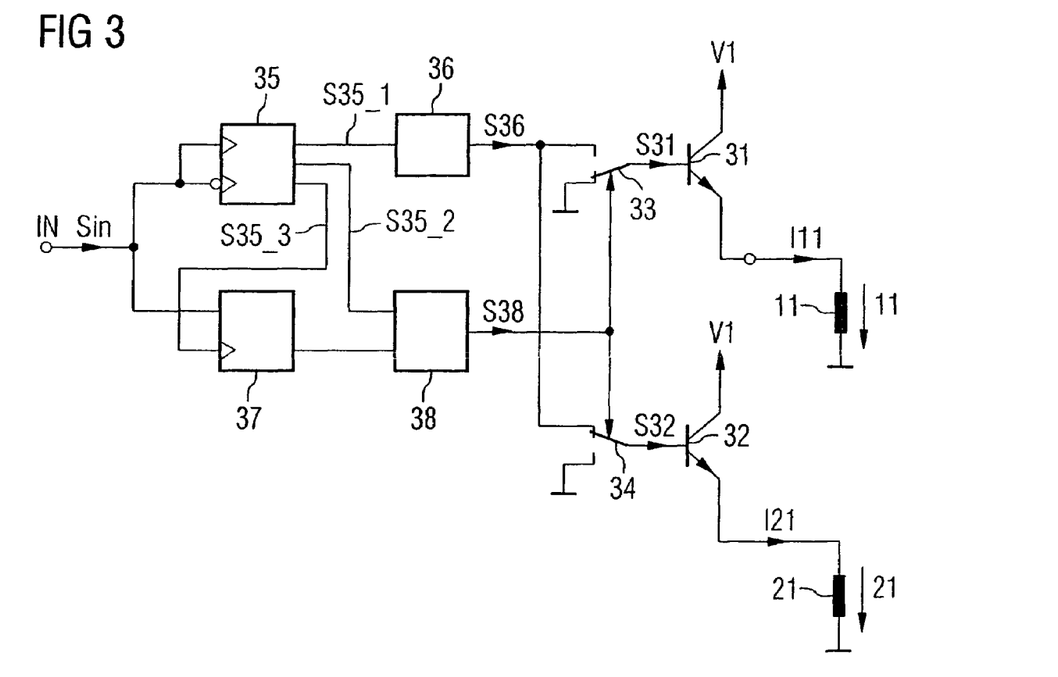
FIG. 3 illustrates an exemplary embodiment of a transmission apparatus for carrying out a method as illustrated in FIG. 2.

FIG. 3 illustrates an implementation example of a transmission apparatus 30 for providing a drive, as explained with reference to FIG. 2, for the primary windings 11, 21 for the method according to the invention.

Figure 4:
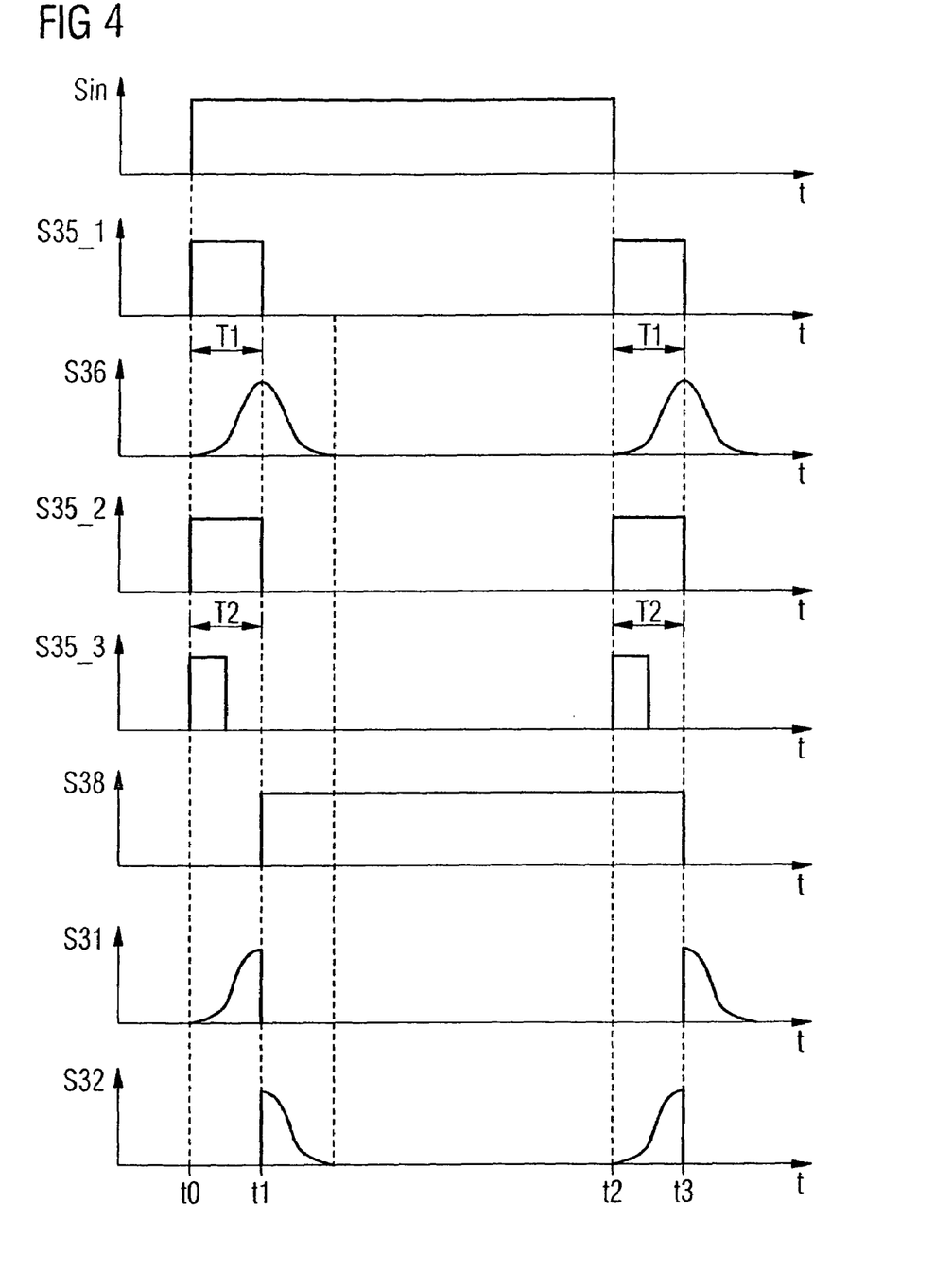
FIG. 4 illustrates, by way of example, the time profiles of selected signals which occur in the transmission apparatus illustrated in FIG. 3.

The transmission apparatus has a signal generator arrangement, which produces an envelope curve signal S36 on the basis of the transmission signal Sin. In the example, this signal generator arrangement has a pulse generator 35, which is designed to produce a first square-wave signal S35_1, which has a square-wave pulse of a predetermined duration both after a rising flank and after a falling flank of the transmission signal Sin. This square-wave pulse S35_1 is supplied to a pulse shaper 36, which produces the envelope curve signal with the desired time profile. The method of operation of the signal generator arrangement and of the pulse shaper is illustrated in FIGS. 4a to 4c which, by way of example, illustrate the time profile of the transmission signal Sin, the time profile which results from this of the first signal S35_1, and the time profile of the envelope curve signal S36 which results from the first signal S35_1, which has square-wave pulses. With reference to FIG. 4, the transmission signal Sin has a rising flank at a time t0, and a falling flank at a later time t2. In a corresponding manner, the pulse generator produces square-wave pulses of the first square-wave signal S35_1 at the first time t0, and at the further time t2. The envelope curve signal S36 likewise has envelope curve pulses with the desired envelope curve profile after the times t0 and t2. The pulse shaper 36 which produces the envelope curve pulses from the square-wave pulses S35_1 is, for example, in the form of a higher-order low-pass filter.

The envelope curve signal S36 is supplied via a distributor circuit to driver circuits 31, 32 for the primary windings 11, 21. In the example, the driver circuits are each in the form of a transistor 31, 32, which is connected as an emitter follower to the respective primary winding 11, 21 between a supply potential V1 and the reference ground potential on the primary side. The distributor circuit has changeover switches 33, 34, which are connected upstream of the driver circuits 31, 32 and are driven by a drive circuit 38. In the example, these changeover switches 33, 34 are driven in such a way that one of the driver circuits 31, 32 is in this case supplied with the envelope curve signal S36 as the input signal, while the input of the other driver circuit is connected to reference ground potential, thus corresponding to an input signal of zero. The inputs of the driver circuits in the example are formed by the base connections of the driver transistors 31, 32.

The switches 33, 34 are driven via the drive circuit 38 as a function of the input signal Sin and as a function of a time control signal S35_2, with this time control signal S35_2 predetermining the switching time at which the envelope curve signal S36 is switched from one driver circuit to the other driver circuit. With reference to FIG. 4, by way of example, this time control signal S35_2 is likewise a square-wave signal that is produced by the pulse generator 35 and starts with the rising or falling flank of the input signal Sin, and whose time duration T2 corresponds, for example, to half the duration Th of an envelope curve pulse of the envelope curve signal S36. This time duration T2 of the time control signal S35_2 may correspond to the time duration of the pulses of the first signal T1, but may be chosen to be different, depending on the configuration of the pulse shaper and the profile of the envelope curve pulses.

The drive circuit 38 in the illustrated example is an XOR gate, one of whose inputs is supplied with the time control signal S35_2, and whose other input is supplied with a signal that is dependent on the input signal Sin. This signal could be the input signal Sin. However, in the example, a latch 37 is connected between the input IN and the drive circuit 38, and temporarily stores the input signal Sin as a function of a clock pulse S35_3. Short-term fluctuations in the input signal Sin therefore have no effect on the drive. The clock pulse S35_3 is produced by the signal generator on a rising or falling flank of the input signal Sin.

With reference to the time profiles in FIG. 4, a low level is applied to both inputs of the drive circuit 38 for the time period of one pulse of the time control signal S35_2 after a rising flank of the input signal Sin, and this leads to the drive signal S38 being at a low level. The first changeover switch 33 is driven by this low level such that the first driver circuit 31 is supplied with the envelope curve signal S36, while the second switch 34 is driven such that it is at the reference ground potential. After the falling flank of the pulse of the time control signal S35_2, a high level is produced at the output of the drive circuit 38, resulting in the two switches 33, 34 switching over. The first switch 33 is then at the reference ground potential, while the second switch 34 passes on the envelope curve signal S36 to the second driver circuit 32.

After a falling flank of the input signal Sin, the two switches 33, 34 are driven in the opposite sequence. After the falling flank, a high level is produced at the output of the drive circuit S38 until the falling flank of the pulse of the time control signal S35_2 occurs, as a result of which the first switch 33 is initially at the reference ground potential, while the second driver circuit 32 is supplied with the envelope curve signal S36 via the second switch 34. After the falling flank of the time control signal pulse, the two switches 33, 34 are switched over. The second switch 34 is then at the reference ground potential, that is to say the input signal to the second driver stage 32 is zero, while the first driver stage 31 is supplied with the envelope curve signal S36 as the input signal.

In the exemplary embodiment of the method according to the invention as explained above, the primary windings 11, 21 are driven in such a way that one of the primary voltages V11, V21 is in each case zero throughout the envelope curve duration Th.

Figure 5:
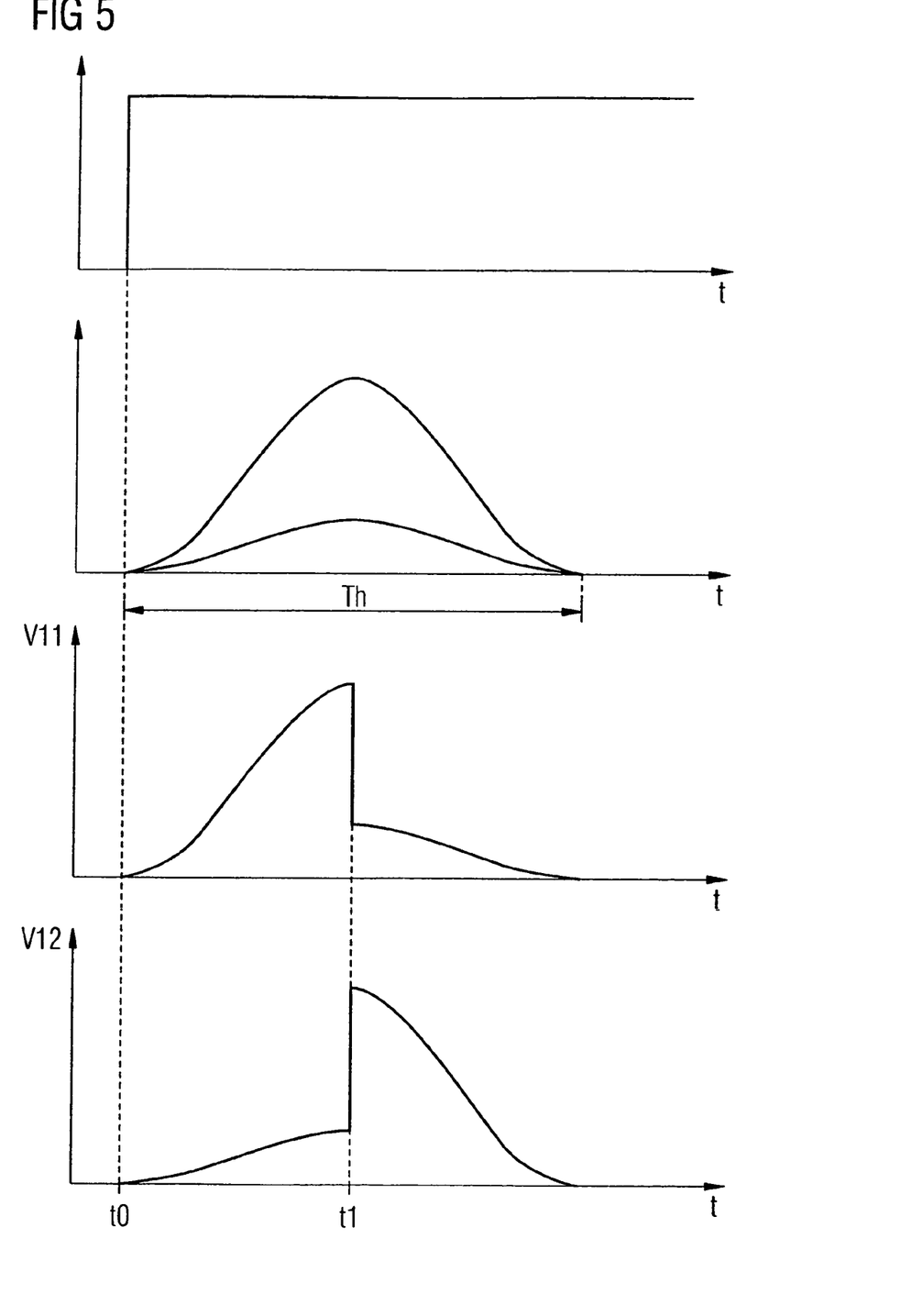
FIG. 5 illustrates a further exemplary embodiment of a method according to the invention, on the basis of time profiles of an input signal (FIG. 5a) and of the voltages across the primary windings of the transformers (FIGS. 5c and 5d).

With reference to FIG. 5, the robustness of the transmission system to disturbance signals can be increased by the primary voltage not falling to zero throughout the envelope curve duration Th. For this purpose, by way of example, a voltage is permanently applied to the two primary windings 11, 21 throughout the envelope curve duration Th, and the time profile of this voltage corresponds, for example, to the time profile of the envelope curve signal, although its amplitude is less than that of the envelope curve signal. The amplitude of this component of the primary voltages which is applied permanently throughout the envelope curve duration may, for example, be between 10% and 40% of the amplitude of the envelope curve.

Primary voltages such as these may be produced, for example, by the inputs of the driver circuits having a first signal permanently applied to them, whose time profile corresponds to the profile of the desired permanent voltage component, and on which the variable signal component is superimposed.

Furthermore, with reference to the circuit illustrated in FIG. 3, it is also possible to connect those connections of the changeover switches which are at the reference ground potential to a potential other than the reference ground potential, in a manner which is not illustrated, with the time profile of this potential corresponding to the desired time of the voltage of the primary winding, which is not driven by the envelope curve signal. A signal profile such as this can be produced, for example, with the aid of a voltage divider from the envelope curve signal.

FIG. 5*b* illustrates the time profile of the envelope curve, while FIGS. 5*c* and 5*d* illustrate the time profiles of the first primary voltage V11 across the first primary winding, and of the second primary voltage V21 across the second primary winding, which each have a permanently applied primary voltage component. In this method, only a proportion of the envelope curve which is, for example, between 60% and 90% of the amplitude of the envelope curve is modulated onto the two primary voltages, that is to say as a function of the information to be transmitted.

Figure 6:
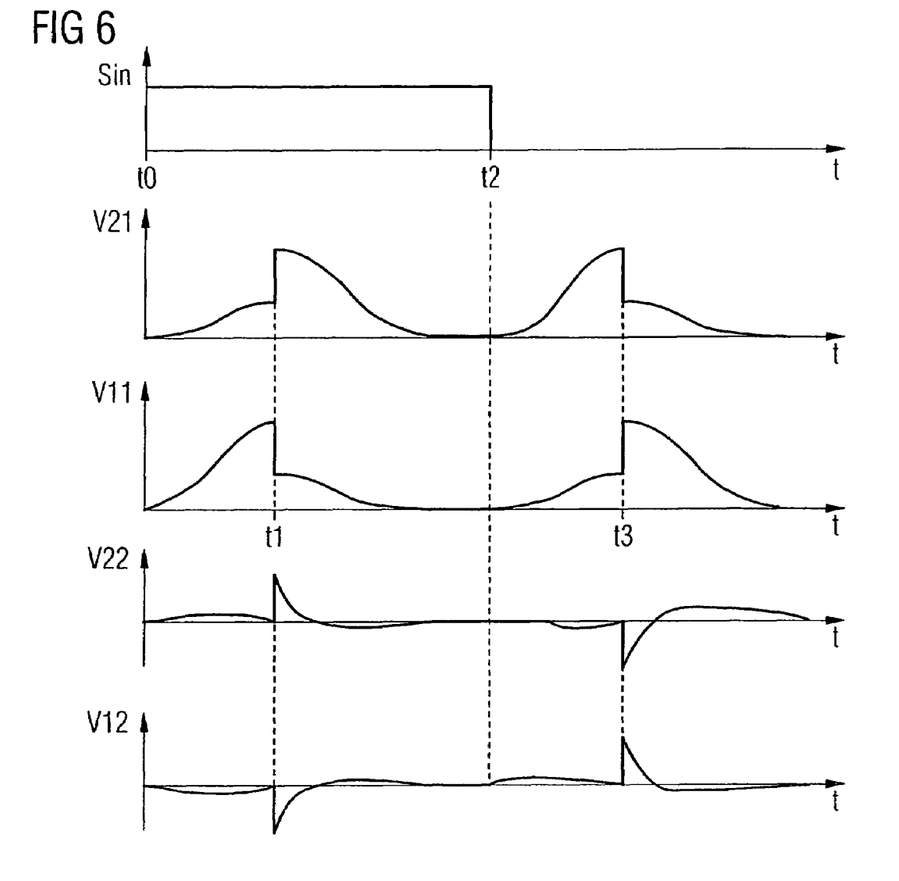
FIG. 6 illustrates, by way of example, time profiles of signals which occur at the transmitter end and at the receiver end in a method according to the second exemplary embodiment.

By way of example, FIG. 6 illustrates the time profiles of the transmission signal Sin, of the first and second primary voltages V11, V21 and of the first and second secondary voltages V12, V22 which result from the first and second primary voltages, for the second exemplary embodiment of the method. It should be noted that the voltage profiles on the secondary side when using the pulse shapes illustrated in FIG. 2 for the first exemplary embodiment do not differ significantly from the voltage profiles on the secondary side when using the pulse shapes, as illustrated in FIG. 5, of the second exemplary embodiment, so that only the pulses on the primary side as illustrated in FIG. 5 will be used as the basis to explain the voltage profiles on the secondary side, in the following text.

As can be seen from the time profiles of the input signal Sin and of the primary and secondary voltages, an information event, in the present case the presence of rising and falling flanks of the transmission signal Sin at the times t0 and t2, is transmitted on a push-pull basis. Voltage pulses of opposite polarity can be detected on the secondary side with a time delay after the rising and falling flanks of the input signal Sin. The time delay results from the time profile of the primary voltages that are derived from the envelope curve, and corresponds to the time delay between the rising or falling flank of the transmission signal Sin and the steep flanks of the primary voltage V11, V21. After a rising flank of the transmission signal Sin, the first primary voltage V11 has a steep falling flank and the second primary voltage V21 has a steep rising flank at a later time t1. This results in a negative voltage pulse on the first secondary voltage V12, and in a positive voltage pulse on the second secondary voltage V22. When a falling flank occurs in the transmission signal Sin, the voltage relationships in the first and second primary and secondary windings are interchanged. The first primary voltage V11 has a steep rising flank at a later time t3 following a falling flank of the transmission signal Sin at the time t2, while the second primary voltage V22 has a steep falling flank. This results in a positive voltage pulse on the first secondary voltage V12 at the time t3, and in a negative pulse on the second secondary voltage V22 at the time t3.

Figure 7:
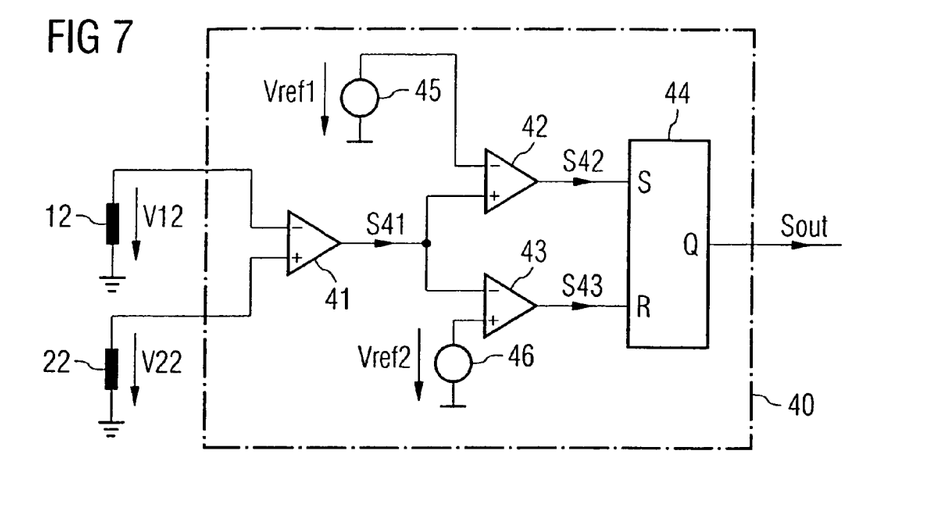
FIG. 7 illustrates an implementation example of a receiver apparatus.
Figure 8:
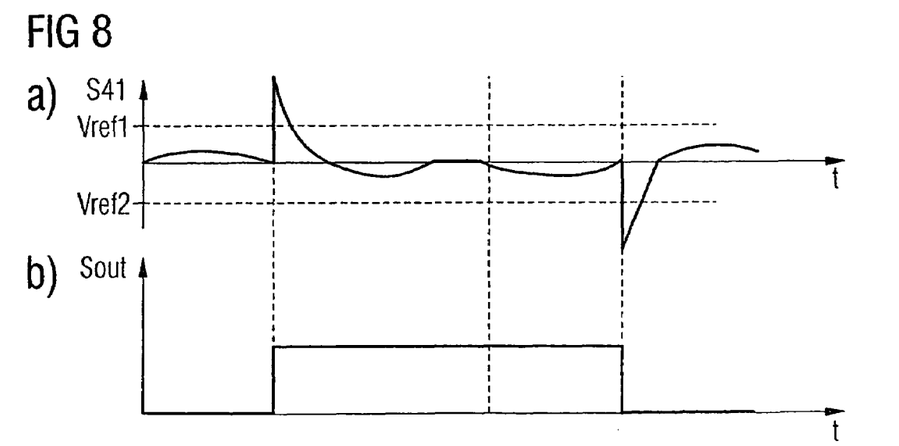
FIG. 8 illustrates by way of example, time profiles of selected signals which occur in the receiver apparatus illustrated in FIG. 7.

FIG. 7 illustrates a circuitry implementation example for reconstruction of the transmission signal Sin from the secondary voltages V12, V22. The receiver circuit 40 has a differential amplifier 41, whose inverting input is supplied with the first secondary voltage V12, and whose non-inverting input is supplied with the second secondary voltage V22. A difference signal S41 is produced at the output of this differential amplifier 41, corresponding to the (amplified) difference between the second secondary voltage V22 and the first secondary voltage V12. The time profile of this difference signal S41 is illustrated in FIG. 8*a* for the time profiles, as illustrated in FIG. 6, of the secondary voltages V12, V22. As can be seen, the difference signal S41 has a positive voltage pulse (which results from the negative voltage pulse on the first secondary voltage V12 and the positive voltage pulse on the second secondary voltage V22) at the time t1, and has a negative voltage pulse (which results from the positive voltage pulse on the first secondary voltage V12 and the negative voltage pulse on the second secondary voltage V22) at the time t3. The differential amplifier 41 is followed by a comparator arrangement with a first and a second comparator 42, 43. The first comparator 42 compares the difference signal S41 with a first threshold voltage Vref1, which is produced by a first reference voltage source 45, and the second comparator 43 compares the difference signal 41 with a second threshold voltage Vref2, which is produced by a second reference voltage source 46. The levels of the threshold voltages Vref1, Vref2 are likewise shown in FIG. 8*a*. The first comparator 42 is thus connected to the differential amplifier 41 and to the first reference voltage source 45 such that, in the example, a high level is produced at the output of this first comparator when the difference signal S41 exceeds the first threshold value Vref1. The second comparator 42 is connected to the reference voltage source 46 and to the differential amplifier 41 such that a high level is produced at the output of this comparator 43 when the difference signal S41 falls below the level of the second threshold value Vref2. The two comparators 42, 43 are followed by a storage circuit, to which the output signals S42, S43 from the two comparators 42, 43 are supplied. In the example, the storage circuit 44 is in the form of an RS flipflop, whose set input is supplied with the first comparator signal S42 and whose reset input is supplied with the second comparator signal S43. The received signal Sout is produced at the output of this flipflop 44, and follows the input signal Sin with a time delay during transmission without any interference. The flipflop 44 is set on a positive pulse of the difference signal S41 at the time t1, as a result of which the received signal Sout assumes a high level, and the flipflop is reset on a negative pulse of the difference signal S41 at the time t3, as a result of which the output signal Sout assumes a low level.

The push-pull transmission method according to the invention is particularly resistant to interference, since it can be assumed that disturbance signals that occur act uniformly on both transmission channels. Such differential-mode disturbance signals are filtered out at the receiver end by the formation of the difference between the two secondary voltages V12, V22 in a simple manner, and thus have no influence on the receiver-end recovery of the transmission signal.

So far, the method according to the invention has been explained for the transmission of a two-value transmission signal Sin. Information events to be transmitted are in this case, for example, rising and falling flanks of the transmission signal Sin, in which case the transmission signal can be reproduced on the secondary side with the knowledge of the times of the rising and falling flanks of the transmission signal Sin. In this case, one information bit is transmitted throughout the envelope curve duration, representing either a rising or a falling flank of the transmission signal Sin. The method may, of course, also be used in such a way that pulses in opposite senses are transmitted per information bit for transmission of a bit stream, and the pulse sequence is recovered on the secondary side from the transmitted pulses. For this purpose, by way of example, a bit value of "1" results in primary voltages as are produced for a rising flank in the example explained above and, for example, primary voltages are produced for a bit value of "0" for this purpose, as are produced on a falling flank of the transmission signal Sin in the example explained above.

As will be explained in the following text with reference to FIG. 9, the method is, however, not restricted to the transmission of only one information bit within the envelope curve period Th.

Figure 9:
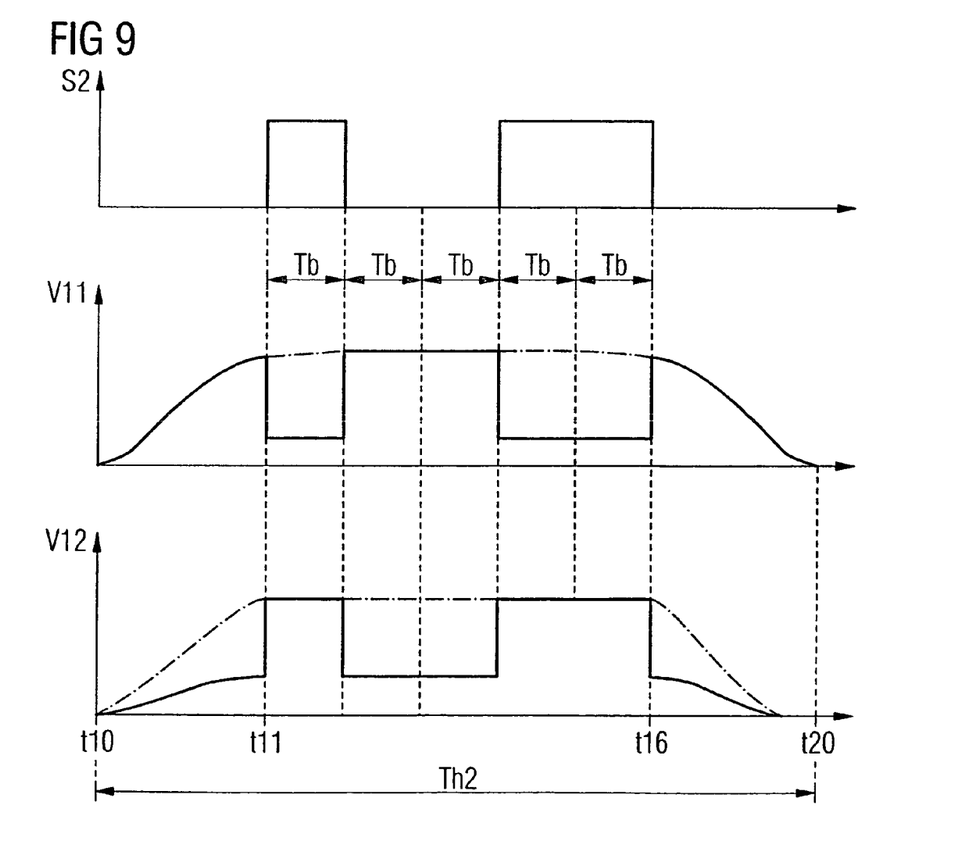
FIG. 9 illustrates a further exemplary embodiment of a method according to the invention.

In fact, with reference to FIG. 9, it is also possible to modulate the envelope curve with a pulse sequence S2 during the envelope curve period Th2. For this purpose, the envelope curve is preferably chosen such that it in each case rises to a maximum value after a starting time t10 within the rise time up to a time t11 and remains at this maximum value for a time period that is not equal to zero until, starting at a time t16, it falls within the fall time to the initial value, which it reaches at a time t20. In this case, the envelope curve is preferably modulated with the pulse sequence S2 during the time period t11-t16 during which the envelope curve has its maximum value. This maximum value period t11-t16 is subdivided into a number of bit periods Tb, five bit periods in the example, with the modulation/mapping of the pulse sequence onto the primary voltages V11, V21 being carried out in such a way that level changes in the pulse sequence lead to steep flanks of the primary voltages V11, V21. A level change in the pulse sequence from a "0" level to a "1" level leads to a falling steep flank of the first primary voltage V11 and to a rising steep flank of the second primary voltage V21, while a change from a "1" level to a "0" level leads to a rising steep flank of the first primary voltage V11 and a falling steep flank of the second primary voltage V21.

The profile of the envelope curve for the two primary voltages V11, V12 is in each case illustrated by dashed-dotted lines. The splitting of the envelope curve between the primary voltages V11, V21 is carried out in the example in such a way that the primary voltages have a permanent voltage component that is not equal to zero throughout the envelope curve duration Th2.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for data transmission via a transmission path having at least two inductive transformers, which each have a primary winding with a time constant and a secondary winding, comprising:

driving the primary windings to transmit an information event by means of drive signals in such a way that the sum of the drive signals follows an envelope curve with the envelope curve duration;

choosing the envelope curve such that its time profile rises within a rise period from an initial value to a maximum value and falls within a fall period from the maximum value back to the initial value, and the magnitudes of the rise period and of the fall period are longer than a time constant of the primary windings; and defining the time profile of the drive signals being dependent on the information transmitted such that there is at least one steep flank, whose flank duration is shorter than the time constants of the primary windings.

2. The method of claim 1, comprising defining the drive signals to be voltages across the primary windings or currents through the primary windings.

3. The method of claim 1, comprising defining the time profiles of the drive signals such that one of the drive signals is in each case at least approximately zero throughout the envelope curve duration.

4. The method of claim 1, comprising wherein the time profiles of the drive signals have a signal component not equal to zero throughout the envelope curve duration.

5. The method of claim 1, comprising defining the time profiles of the drive signals such that there is a steep flank immediately or a short time after a time at which the envelope curve reaches its maximum value.

6. The method of claim 5, comprising defining the envelope curve such that it falls again immediately after the steep flank of the time profiles of the drive signals.

7. The method of claim 1, comprising wherein which the envelope curve remains at the maximum value for a predetermined time period after the rise period.

8. The method of claim 1, comprising wherein the signal profiles of the drive signals have more than one steep flank, whose timing is dependent on the information event to be transmitted.

9. The method of claim 1, comprising defining the envelope curve to have a profile of a Gaussian curve or the profile of a section of a sine-squared curve.

10. A method for data transmission via a transmission path having at least two inductive transformers, which each have a primary winding with a time constant and a secondary winding, including receiver-end determination of the transmitted information event, comprising:

driving the primary winding to transmit an information event by means of drive signals in such a way that the sum of the drive signals follows an envelope curve with the envelope curve duration;

choosing the envelope curve such that its time profile rises within a rise period from an initial value to a maximum value and falls within a fall period from the maximum value back to the initial value, and the magnitudes of the rise period and of the fall period are longer than a time constant of the primary windings;

defining the time profile of the drive signals being dependent on the information transmitted such that there is at least one steep flank, whose flank duration is shorter than the time constants of the primary windings;

recording received signals tapped off from the secondary windings;

forming a difference signal from the received signals; and comparing the difference signal with a first and a second threshold value.

11. An apparatus for data transmission, comprising:

a transmission path with at least two inductive transformers, which each have a primary winding with a time constant, and a secondary winding;

a transmission apparatus, which is connected to the primary winding, with an input for supplying a transmission signal which produces drive signals for the primary windings in such a way that the sum of the drive signals follows an envelope curve with the envelope curve duration;

with the envelope curve being defined such that its time profile rises within a rise period from an initial value to a maximum value and falls within a fall period back to the initial value, and that the magnitudes of the rise period and of the fall period are longer than the time constants of the primary windings;

with the time profile of the drive signals being dependent on the information transmitted and being chosen such that there is at least one steep flank, whose flank duration is shorter than the time constants of the primary windings.

12. The apparatus of claim 11, comprising:

a first driver stage, connected to a first of the primary windings, and a second driver stage, connected to a second of the primary windings, a signal generator, configured to produce an envelope curve signal, that predetermines the envelope curve, as a function of the input signal; and a distributor circuit, configured to split the envelope curve signal as a function of the input signal into at least two signal elements, one of which is in each case supplied to one of the driver circuits in order to produce the drive signals.

13. The apparatus of claim 12, comprising wherein the signal generator has a pulse generator and a pulse shaper, which is connected downstream from the pulse generator.

14. The apparatus of claim 13, comprising wherein the distributor circuit is configured such that in each case one of the signal elements is zero.

15. The apparatus of claim 14, comprising wherein the driver circuits and the distributor circuit are designed such that both drive signals have a signal component which is not equal to zero throughout a time period during which the envelope curve signal is not equal to zero.

16. The apparatus of claim 15, which has a receiver circuit comprising:

a differential amplifier with a first input which is connected to one of the secondary windings and with a second input which is connected to the other of the secondary windings, and which produces a difference signal; and a comparator arrangement, which is connected downstream from the differential amplifier and compares the difference signal with a first and a second threshold value.

17. The apparatus of claim 12, comprising wherein the distributor circuit is configured such that in each case one of the signal elements is zero.

18. The apparatus of claim 12, comprising wherein the driver circuits and the distributor circuit are designed such that both drive signals have a signal component which is not equal to zero throughout a time period during which the envelope curve signal is not equal to zero.

19. The apparatus of claim 11, which has a receiver circuit comprising:

a differential amplifier with a first input which is connected to one of the secondary windings and with a second input which is connected to the other of the secondary windings, and which produces a difference signal; and a comparator arrangement, which is connected downstream from the differential amplifier and compares the difference signal with a first and a second threshold value.

20. An apparatus for data transmission, comprising:

a transmission path with at least two inductive transformers, which each have a primary winding with a time constant, and a secondary winding;

means for transmission, which is connected to the primary windings, with an input for supplying a transmission signal which produces drive signals for the primary windings in such a way that the sum of the drive signals follows an envelope curve with the envelope curve duration;

with the envelope curve being defined such that its time profile rises within a rise period from an initial value to a maximum value and falls within a fall period back to the initial value, and that the magnitudes of the rise period and of the fall period are longer than the time constants of the primary windings;

with the time profile of the drive signals being dependent on the information transmitted and being chosen such that there is at least one steep flank, whose flank duration is shorter than the time constants of the primary windings.

* * * * *

UNITED STATES PATENT AND TRADEMARK OFFICE
CERTIFICATE OF CORRECTION

| | | |
|---|---|---|
| PATENT NO. | : 7,492,827 B2 | Page 1 of 1 |
| APPLICATION NO. | : 11/201822 | |
| DATED | : February 17, 2009 | |
| INVENTOR(S) | : Feldtkeller | |

It is certified that error appears in the above-identified patent and that said Letters Patent is hereby corrected as shown below:

On the title page item (30), Foreign Application Priority Data, delete "Dec. 8, 2004" and insert in place thereof -- Aug. 12, 2004 --.

Signed and Sealed this

Twenty-ninth Day of September, 2009

David J. Kappos
*Director of the United States Patent and Trademark Office*